Nov. 24, 1953 — P. G. KIEHL ET AL — 2,659,992
FILM MOUNT
Filed March 15, 1948 — 2 Sheets-Sheet 1
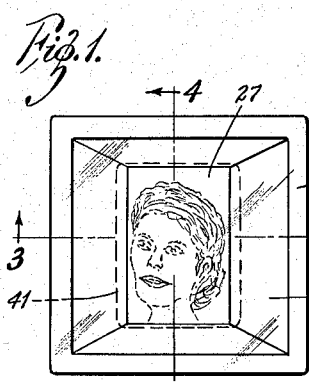
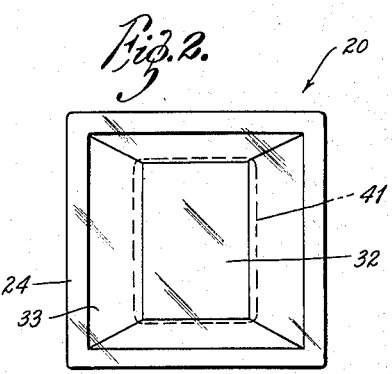
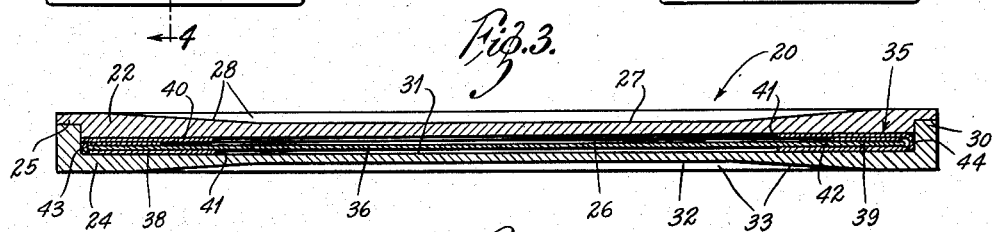
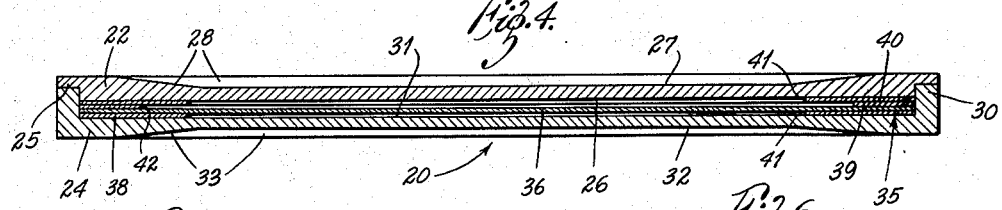
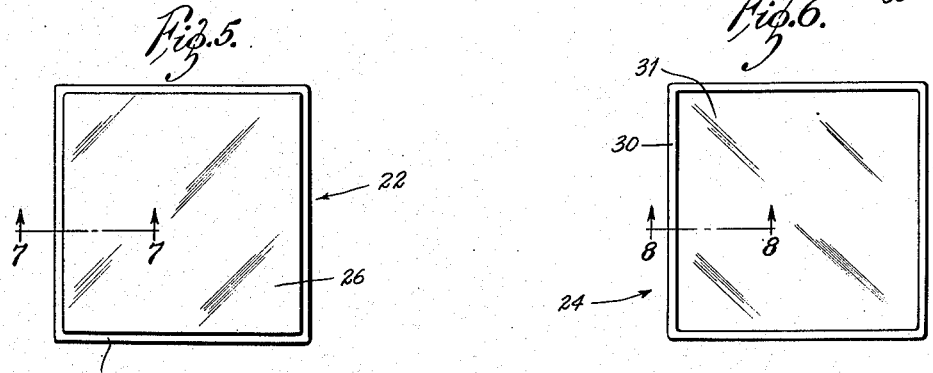
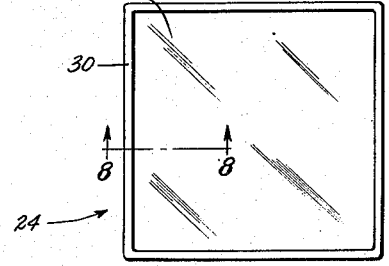
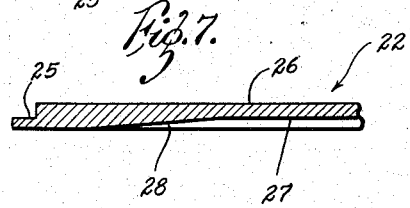
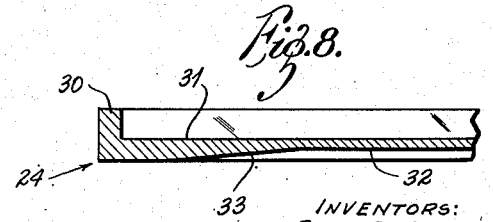
INVENTORS:
PAUL G. KIEHL,
WILLIAM H. KOLATH, JR.
BY Rogers & Ezell
ATTORNEYS.

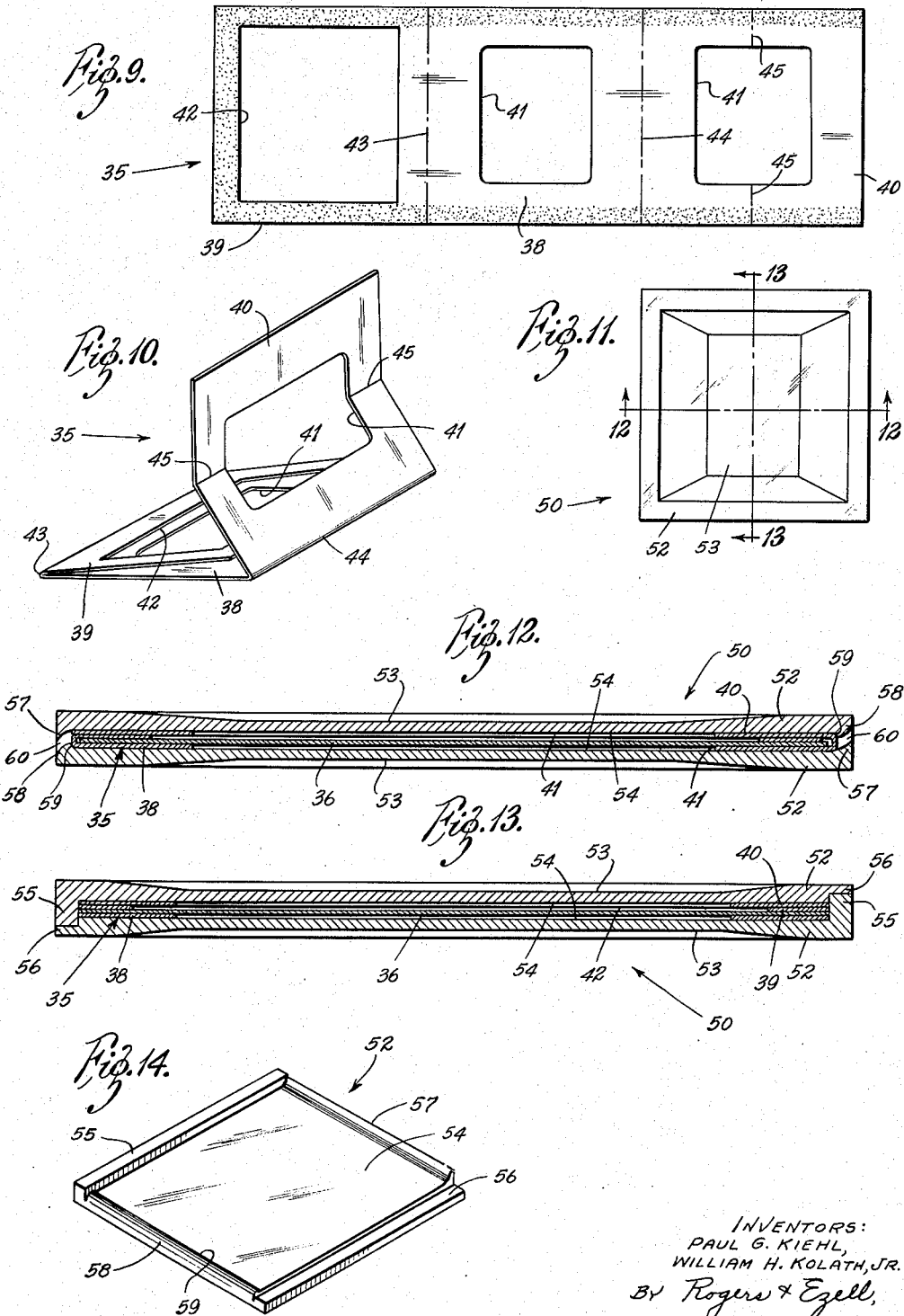

Patented Nov. 24, 1953

2,659,992

UNITED STATES PATENT OFFICE 2,659,992

FILM MOUNT

Paul G. Kiehl, St. Louis, and William H. Kolath, Jr., Webster Groves, Mo.

Application March 15, 1948, Serial No. 15,004

3 Claims. (Cl. 40—159)

The present invention relates generally to binders for slides for projection machines, and the like, and more particularly to a plastic slide binder, and to a transparency mask used in conjunction with the plastic binder.

An object of the present invention is to provide a novel plastic slide binder which is adapted to hold and seal a transparency, such as a film or other object suitable for mounting, against dust and other foreign matter.

Another object is to provide a novel plastic slide binder which is formed to prevent scarring of the face of the binder in order to insure long life of the device. It is well known that scratches on plastic material reduce the transmission of light therethrough, which will, of course, result in marring the image of the film contained within the plastic binder when projected.

Another object is to provide a novel plastic slide binder which is adapted to readily receive a mask and its film, and which may be quickly closed and sealed to preserve the enclosed film.

Another object is to provide a novel plastic slide binder which is formed of a pair of identical halves, and which incorporates open ends for the ready insertion of a slide mask and a contained film.

Another object is to provide a novel transparency mask which is formed to readily receive a film, or the like.

Other objects are to provide a novel plastic slide binder and a novel film mask which are inexpensive, which are readily assembled, which are long lasting, which are proof against breakage either in use or in shipment, and which are adapted to fulfill the advantages set forth therefor.

Other objects and advantages are apparent from the following description taken with the accompanying drawings, in which:

Fig. 1 is a front view of a plastic slide binder constructed in accordance with the teachings of the present invention, enclosing a film mask and a film;

Fig. 2 is a rear view thereof;

Fig. 3 is an enlarged cross-sectional view on substantially the line 3—3 of Fig. 1;

Fig. 4 is an enlarged cross-sectional view on substantially the line 4—4 of Fig. 1;

Fig. 5 is a view of the inner surface of the top member;

Fig. 6 is a view of the inner surface of the base member;

Fig. 7 is an enlarged fragmentary cross-sectional view on substantially the line 7—7 of Fig. 5;

Fig. 8 is an enlarged fragmentary cross-sectional view on substantially the line 8—8 of Fig. 6;

Fig. 9 is a view of a film mask shown in extended unfolded position;

Fig. 10 is an isometric view of the mask in partially folded position;

Fig. 11 is a front view of a modified plastic slide binder embodying the teachings of the present invention;

Fig. 12 is an enlarged cross-sectional view on substantially the line 12—12 of Fig. 11;

Fig. 13 is an enlarged cross-sectional view on substantially the line 13—13 of Fig. 11; and Fig. 14 is an isometric view of the inner surface of one of the identical members forming the binder of Fig. 11.

Referring to the drawings more particularly by reference numerals, 20 indicates generally a plastic slide binder incorporating the teachings of the present invention (Figs. 1-4). The binder 20 is made of clear plastic, such as polystyrene, Lucite, or other plastics. The binder 20 includes a top member 22 (Figs. 5 and 7) and a base member 24 (Figs. 6 and 8).

The top member 22 includes a shoulder 25 extending around the full circumference thereof, a planar inner surface 26, and an inset central outer surface 27, the area of which is determined by the picture to be projected. Inwardly beveled surfaces 28 lead to the surface 27.

The base member 24 includes a flange 30 extending around the full circumference thereof, a planar inner surface 31, a central inset outer surface 32, and beveled surfaces 33 leading to the surface 32.

Figs. 3 and 4 clearly show the relationship of the top member 22 and the base member 24 when assembled, which are sealed at their juncture around the full circumference by suitable bonding chemicals, heat, or the like. The inner surface 26 of the former is spaced a predetermined fraction of an inch from the inner surface 31 of the latter.

Within the binder 20 is a film mask 35 (Figs. 3, 4, 9 and 10) which holds a film 36 positioned to be substantially framed by the central inset outer surfaces 27 and 32.

The film mask 35 is formed of thin flexible material, such as paper, or the like, and preferably includes a central portion 38 and end portions 39 and 40 (Figs. 9 and 10). The central portion 38 and the end portion 40 have central openings or cutouts 41 of the size of the film portion to be projected. A central opening or cutout 42 of larger size is provided in the portion 39. Glue may be applied to one side of the mask 35, as shown, or other sealing means, such as interlocking perforations, heat or friction sealing means, or the like may be used. The portion 39 is folded about the line 43 into contiguous relationship with the portion 38 after the glue on the portion 39 is moistened. Thereafterwards, the portion 40 is folded about the line 44 to engage half of the portion 40 with the portion 39 after the portion 40 has been folded about the interrupted center line 45. A portion of the glue on the portion 40 is dampened in order to engage the portion 39 without engaging the portion 38. It will be appreciated that there is thus provided a pocket defined by the glued half of the portion 40 and the facing half of the portion 38 which is of a width equal to the thickness of the portion 39 which lies therebetween. The film 36 may be slipped into the pocket thus formed and thereafterwards secured in position by moistening the outer area of the free half of the portion 40 and placing it against the portion 39. The film 36 will be trapped between the portions 38 and 40 and will be disposed within the cutout of the portion 39.

In Figs. 11 through 14 is shown a modified plastic slide binder 50 which includes a pair of opposed identical members 52. Each member 52 is of the form clearly shown in the drawings, and includes a central outer inset face 53, a planar inner surface 54, a flange 55 along one edge, a shoulder 56 along the opposite edge, a wall 57 along a third edge which slopes into the surface 54, and a fourth edge 58 which is convex in cross section, as is clear from Fig. 12. A shoulder 59 is formed at the inner reach of the edge 58.

Figs. 12 and 13 show the binder 50 enclosing a mask 35 and film 36, being sealed along two edges as the binder 20 is sealed. It is manifest that the portion of the film 36 to be projected is substantially framed by the central outer inset surfaces 53. It is also clear from these views that the flange 55 of one member 52 engages the shoulder 56 of the other, and that the wall 57 of one member 52 overlies the edge 58 of the other (Fig. 12). Hence, two slots 60 are provided for the insertion and removal of the mask 35 and its enclosed film 36. The shoulders 59 retain the mask 35 in place.

As is clear from the foregoing, the film 36 is only illustrative, the mask 35 being adapted to hold any form of transparency. It is also clear that the mask 35 may be used apart from the binders.

It is apparent that there has been provided a plastic slide binder and a film mask which fulfill the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. A slide binder comprising a transparent top member, said top member having a continuous shoulder extending around the entire periphery thereof, a transparent base member, said base member including a flange extending around the entire periphery thereof, said flange having an upper surface underlying and abutting said top member shoulder, and a chamber between said members for receiving a slide.

2. A slide binder comprising a transparent top member, said top member having a continuous shoulder extending around the entire periphery thereof, and a transparent base member, said base member including a flange extending around the entire periphery thereof coextensive with and abutting said top member shoulder, each of said members having a planar inner surface, said surfaces being disposed in parallel relation to form with said flange a chamber.

3. A slide binder comprising a transparent top member, said top member having a continuous shoulder extending around the entire periphery thereof, a transparent base member, said base member including a flange extending around the entire periphery thereof coextensive with and abutting said top member shoulder, each of said members having an external inset central surface, and a chamber between said members for receiving a slide.

PAUL G. KIEHL.
WILLIAM H. KOLATH, JR.

References Cited in the file of this patent

UNITED STATES PATENTS

| Number | Name | Date |
|---|---|---|
| 560,080 | Booher | May 12, 1896 |
| 764,273 | Denton et al. | July 5, 1904 |
| 1,464,447 | Shvachka et al. | Aug. 7, 1924 |
| 1,500,025 | Mayer | July 1, 1924 |
| 2,014,743 | Metzler et al. | Sept. 17, 1935 |
| 2,186,643 | Kaplan | Jan. 9, 1940 |
| 2,227,986 | Tucker | Jan. 7, 1941 |
| 2,336,196 | Sparling | Dec. 7, 1943 |
| 2,361,479 | Joffo | Oct. 31, 1944 |
| 2,361,670 | Whitehead | Oct. 31, 1944 |
| 2,505,250 | Kime | Apr. 25, 1950 |
| 2,527,765 | Roehrl | Oct. 31, 1950 |